United States Patent
Chiu

(10) Patent No.: US 10,027,154 B2
(45) Date of Patent: Jul. 17, 2018

(54) CAR JUMP STARTER HAVING WARNING LED PANEL

(71) Applicant: Hsien-Hsu Chiu, New Taipei (TW)

(72) Inventor: Hsien-Hsu Chiu, New Taipei (TW)

(73) Assignee: Hualin Precision Technology Co., Ltd., New Taipei (TW)

( * ) Notice: Subject to any disclaimer, the term of this patent is extended or adjusted under 35 U.S.C. 154(b) by 85 days.

(21) Appl. No.: 14/874,534

(22) Filed: Oct. 5, 2015

(65) Prior Publication Data

US 2016/0359352 A1   Dec. 8, 2016

(30) Foreign Application Priority Data

Jun. 8, 2015 (TW) ............................. 104209094 U
Aug. 27, 2015 (TW) ............................. 104213949 U

(51) Int. Cl.
| | |
|---|---|
| *H02J 7/00* | (2006.01) |
| *F02N 11/12* | (2006.01) |
| *G09F 11/00* | (2006.01) |
| *G09F 9/30* | (2006.01) |
| *G08B 5/00* | (2006.01) |
| *G09F 13/22* | (2006.01) |
| *F02N 11/14* | (2006.01) |

(52) U.S. Cl.
CPC ............ *H02J 7/0047* (2013.01); *F02N 11/12* (2013.01); *G08B 5/00* (2013.01); *G09F 9/301* (2013.01); *G09F 11/00* (2013.01); *G09F 13/22* (2013.01); *H02J 7/007* (2013.01); *H02J 7/0052* (2013.01); *F02N 11/14* (2013.01); *G09F 2013/222* (2013.01); *H02J 7/0054* (2013.01)

(58) Field of Classification Search
USPC .......................................................... 320/105
See application file for complete search history.

(56) References Cited

U.S. PATENT DOCUMENTS 5,895,440 A * 4/1999 Proctor ..................... B60L 3/12
                                                       320/138
6,022,124 A * 2/2000 Bourn ................ G01N 21/8806
                                                       362/231

(Continued)

FOREIGN PATENT DOCUMENTS

TW           M423638 U      3/2012

*Primary Examiner* — Samuel Berhanu
(74) *Attorney, Agent, or Firm* — Alan D. Kamrath; Kamrath IP Lawfirm, P.A.

(57) ABSTRACT

A car jump starter having warning LED panel is provided. The car jump starter having warning LED panel is configured to deliver power to automobile battery of the car and the car jump starter having warning LED panel includes case and LED panel. The case includes output ends, input end, battery and output module. The output ends are disposed at one side of the case and the output ends are configured to be electrically connected with external electronic device. The input end is disposed at one side of the case and the input end is configured to be electrically connected with external power. The battery is disposed in the case. Then, the output module is electrically connected with the battery, and the output module is configured to deliver power to the automobile battery. Moreover, the LED panel is disposed on the case, and the LED panel includes multiple LED modules.

10 Claims, 3 Drawing Sheets

(56) References Cited

U.S. PATENT DOCUMENTS

| | | | |
|---|---|---|---|
| 6,636,015 B1* | 10/2003 | Levine | H01M 2/1072 320/104 |
| 6,666,586 B2 | 12/2003 | Wu et al. | |
| 7,250,612 B2* | 7/2007 | Pai-Paranjape | H01M 2/1066 250/458.1 |
| 2003/0227278 A1* | 12/2003 | Sakuragi | G09G 3/3216 320/135 |
| 2005/0274050 A1* | 12/2005 | Liu | G09F 9/33 40/544 |
| 2013/0004003 A1* | 1/2013 | Tada | H01M 2/1044 381/323 |
| 2013/0164025 A1* | 6/2013 | Mori | G03G 21/1633 399/107 |
| 2014/0159509 A1* | 6/2014 | Inskeep | H02J 7/0063 307/150 |

* cited by examiner

CAR JUMP STARTER HAVING WARNING LED PANEL

BACKGROUND OF THE INVENTION

Field of Invention

The present invention relates to a mobile power, more particularly to a car jump starter having warning LED panel.

Description of Related Art

The conveyance for commuting, especially a car, brings great convenience for people; however, an automobile battery of the car is often dead because of different reasons which makes the car not being able to get started. The common reasons are listed in the followings:

The automobile appliances remain on after the car engine is closed like a lamplight, an audio or an event data recorder etc.

The automobile battery has not been used in a long time or the automobile battery has been aging till a certain extend;

The automobile battery cannot be normally charged because of the failure of a generator, and etc.

While the automobile battery is dead, the traditional solution is to connect the dead automobile battery with the one from another car, so as to provide the power to start the engine. However, it happens sometimes not being able to find another car to charge in many conditions.

Car jump starters in the present market are common for timely charging the automobile battery. However, those batteries play the roles like spare automobile batteries, the weight of each battery is about 5~15 kilograms. Furthermore, the car jump starters are easily forgotten by a user and causes inconveniences.

Moreover, a warning triangle is placed behind the car to warn the user of other vehicle when the car is broken and placed in a traffic lane. However, the warning triangle is difficult to be placed and cannot efficiently warn the drivers of the other moving vehicles when the user drives under dark sky or on the high speed road (especially on the superhighway in the evening).

Thus, these problems described above still need to be overcome.

SUMMARY OF THE INVENTION

One object of the instant invention is to provide a car jump starter having warning LED panel which has the function of supplying the power required for a car and warning the drivers of the other moving vehicles.

To achieve the above-mentioned object and other objects, a car jump starter having warning LED panel is provided. The car jump starter having warning LED panel is configured to deliver power to an automobile battery of the car and the car jump starter having warning LED panel includes a case and a LED panel. The case includes multiple output ends, an input end, a battery and an output module. The output ends are disposed at one side of the case and the output ends are configured to be electrically connected with an external electronic device. The input end is disposed at one side of the case and the input end is configured to be electrically connected with an external power for charging the battery. The battery is disposed in the case. Then, the output module is electrically connected with the battery and the output module is configured to deliver power to the automobile battery. Moreover, the LED panel is disposed on the case and the LED panel includes multiple LED modules.

In the above-mentioned car jump starter having warning LED panel, the LED module is a RGB LED.

In the above-mentioned car jump starter having warning LED panel, the output ends include an USB output port and a 12 volt output port.

In the above-mentioned car jump starter having warning LED panel, the car jump starter having warning LED panel further includes a control module which is electrically connected between the output ends and the battery and the control module is configured to control the output power of the output ends.

In the above-mentioned car jump starter having warning LED panel, the car jump starter having warning LED panel further includes at least a cover having multiple LED modules, the cover is connected by a pivot bearing to a rim of the case and the cover is configured to be rotated around the rim of the case and close a top surface of the case.

In the above-mentioned car jump starter having warning LED panel, the car jump starter having warning LED panel further includes a sticking element which is disposed at another side of the case and the sticking element is configured to be stuck on an external object.

In the above-mentioned car jump starter having warning LED panel, the sticking element is a magnet.

In the above-mentioned car jump starter having warning LED panel, the car jump starter having warning LED panel further includes a lighting LED.

In the above-mentioned car jump starter having warning LED panel, the external electronic device is a smart phone, a tablet PC computer, a smart watch or an event data recorder.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1:
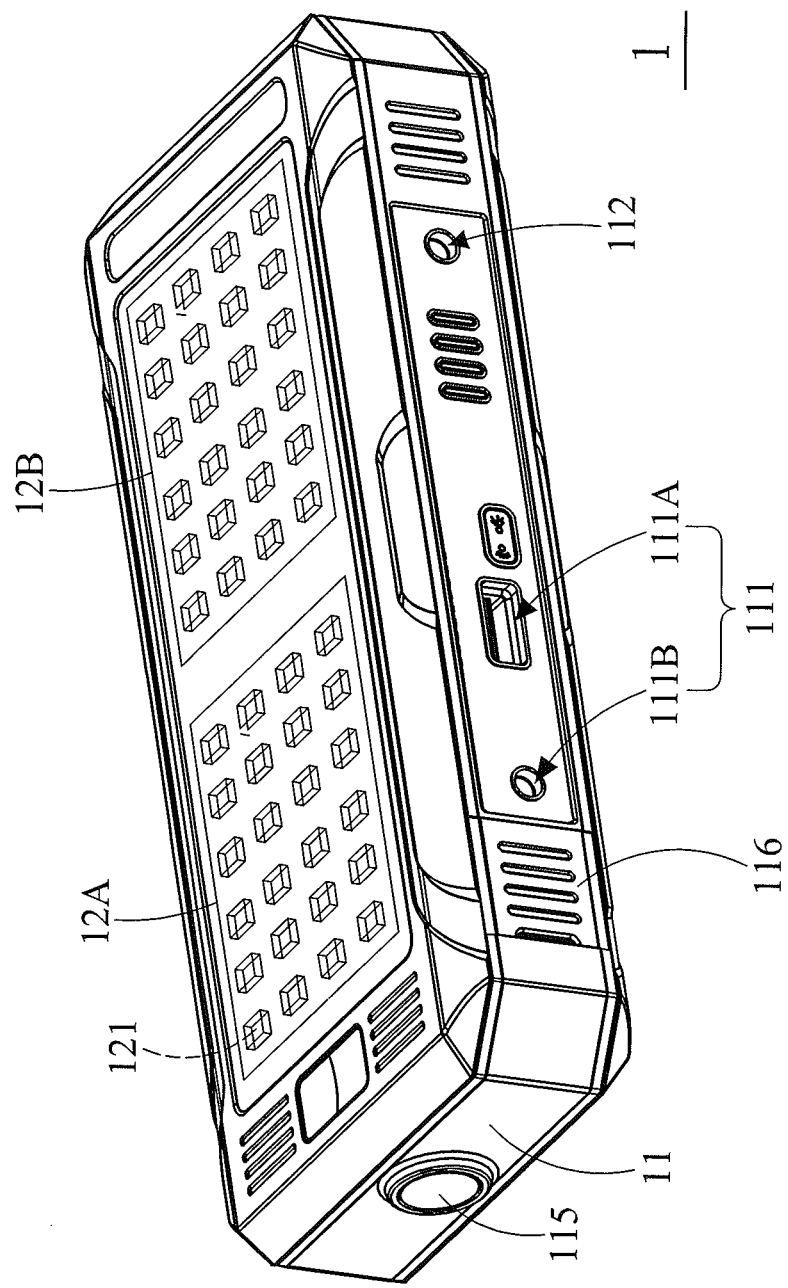
FIG. 1 illustrates a schematic diagram of a car jump starter having warning LED panel of present embodiment in the instant invention.
Figure 2:
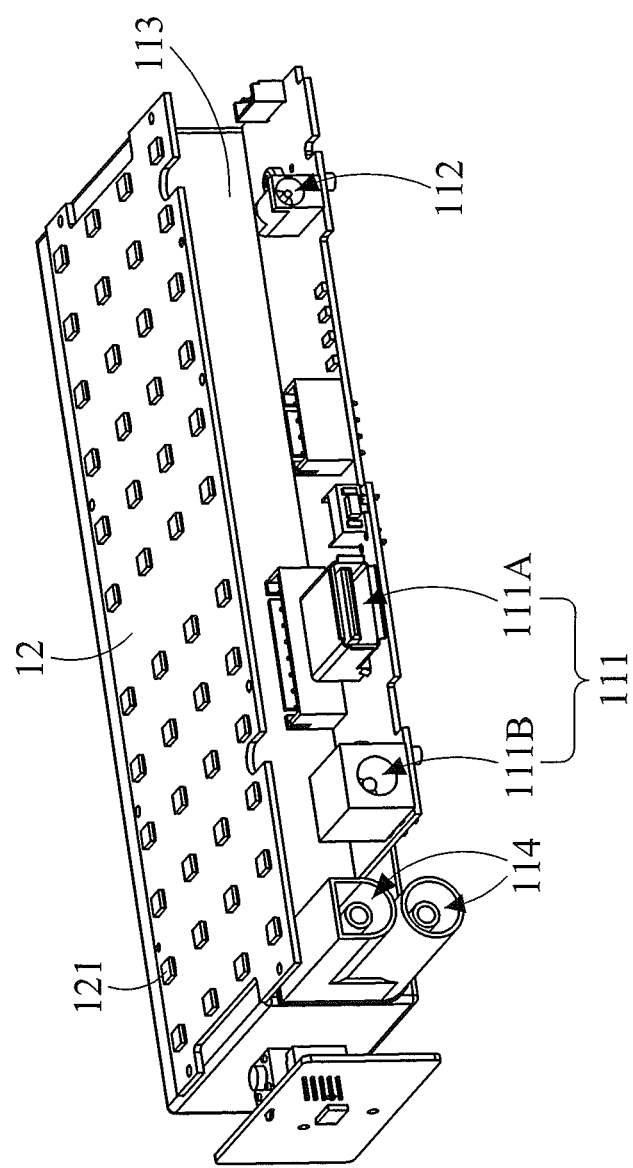
FIG. 2 illustrates a schematic diagram of an inner structure of the car jump starter having warning LED panel of present embodiment in the instant invention.

Please refer to FIG. 1 and FIG. 2, FIG. 1 illustrates a schematic diagram of a car jump starter having warning LED panel of present embodiment in the instant invention, and FIG. 2 illustrates a schematic diagram of an inner structure of the car jump starter having warning LED panel of present embodiment in the instant invention. The car jump starter having warning LED panel 1 is provided, and the car jump starter having warning LED panel 1 is configured to deliver power to an automobile battery of a car. The car jump starter having warning LED panel 1 includes a case 11 and a LED panel 12. The LED panel 12 is disposed on one surface of the case 11 (such as top surface), and the overall shape of the LED panel 12 looks like a planar shape, and the LED panel 12 includes multiple LED modules 121. In the present embodiment, the LED panel 12 is divided into two blocks, and the two blocks are a left LED block 12A and a right LED block 12B, respectively. And, the left LED block 12A and the right LED block 12B both have 24 LED modules 121. The LED module 121 is a monochrome LED, and different LED modules 121 having different colors are disposed in the left LED block 12A and the right LED block 12B. By switching the LED modules 121 of different colors, the overall color emitted from the LED panel 12 would be different, so the LED panel 12 has the function of warning in different conditions, but lighting modes of the LED panel 12 are not limited in it. In other embodiment, the LED module 121 is a RGB LED, comprised of three-primary color LED units, and more different colors can be created by switching the three-primary color LED units, so the LED panel 12 using the RGB LED also has the function of warning the drivers of other moving vehicles.

24 LED modules 121 in each block are simultaneously lit. One of the two blocks (for example: the left LED block 12A) is lit or closed when another of the two blocks (for example: the right LED block 12B) is lit. For instance, the LED module 121 of the right LED block 12B is lit or closed when the 24 LED modules 121 of the left LED block 12A is lit. In other words, the left LED block 12A and the right LED block 12B can be simultaneously or alternatively lit. Therefore, by simultaneous or alternative lighting of the left LED block 12A and the right LED block 12B, the car jump starter having warning LED panel 1 has different flashing modes. Furthermore, the flashing frequencies of the two LED blocks, i.e. the left LED block 12A and the right LED block 12B, can also be adjusted, and greatly increasing the warning effect. Moreover, a flashing period of the LED module 121 can also be adjusted. By adjusting the flashing period and the color of the lighting, the LED module 121 can meet the different needs or specific regulatory norms.

Furthermore, the case 11 looks like a rectangular shape, and each corner of the case 11 is a circular angle. The case 11 includes multiple output ends 111, an input end 112, a battery 113, an output module 114, and a lighting LED.115. The output ends 111 are disposed at one side of the case 11, and the output ends 111 are configured to be electrically connected with an external electronic device. For example, the external electronic device is a smart phone, a tablet PC computer, a smart watch, or an event data recorder etc. In other words, the output ends 111 are configured to deliver the power stored in the car jump starter having warning LED panel 1 to the external electronic device for charging, and the output ends 111 includes an USB output port 111A and a 12 volt output port 111B. The outputting volts of the output ends 111 are different to each other. For instance, the USB output port 111A is configured to charge the smart phone, a digital camera, or a camera etc, and the 12 volt output port 12B is configured to charge a 12 volt automobile electric appliance. The 12 volt automobile electric appliance is an automobile vacuum cleaner, an automobile electric fan, or an automobile inflator etc, but the specifications of the output ends 111 are not limited in the above-mentioned embodiments, some people having ordinary skill in the art can replace the two output ports of present embodiment by the output ports of other specifications. For example, the output port can be an USB Type-C or a Lightning interface for APPLE products. Therefore, connecting ports of different specifications of the car jump starter having warning LED panel 1 are provided to charge the external electronic devices of different specifications, and the applications of the car jump starter having warning LED panel 1 are greatly increased.

The input end 112 is disposed at one side of the case 11 and the input end 112 is configured to be electrically connected with an external power. For example, the external power is an indoor power or an automobile internal power, a battery 113 of the car jump starter having warning LED panel 1 is charged by the input end 112. The battery 113 is disposed in the case 11 and the battery 113 is configured to provide the power for lighting the LED module 121 of the car jump starter having warning LED panel 1. The power stored in the battery 113 can also be outputted from the output module 114. The two output ports of the output module 114 are vertically arranged and an input end of the output module 114 is connected with the battery 113 and two output ports of the output module 114 are connected with the automobile battery. Therefore, the needed power for starting the engine is provided by the output module 114 of the car jump starter having warning LED panel 1 when an engine of the car cannot be started due to the shortage of the automobile battery. The output power of the output module 114 is greater than that of the output ends 111. Please be noted that the output module 114 has the greater instant output power, a maximum of the instant output power can reach about 400 amperes, so the external low-power electronic device should not be charged by the output module 114 for avoiding being damaged. Moreover, a protecting cover 116 is needed to cover the output module 114 and the protecting cover 116 covers the output module 114 when the output module 114 is not used, thus preventing the user from touching the output module 114 and getting hurt.

The lighting LED 115 is disposed at one side of the case 11 and configured to emit the light having higher brightness. More specifically, the different lighting modes of the lighting LED 115 can be provided for the user, the lighting mode of lighting LED 115 can be switched to the flashing mode, such as SOS mode, by pressing a switch of the lighting LED 115 in a while.

Moreover, the car jump starter having warning LED panel 1 further includes a sticking element and a control module. The sticking element is disposed at another side of the case 11 and the sticking element is configured to be stuck on an external object. For example, the sticking element is a magnet, and the external object is the car. The car jump starter having warning LED panel 1 of present embodiment can be stuck on a car roof or a car body by the sticking element, so the car jump starter having warning LED panel 1 can be fixed on the car roof and the car body. The lighting function of the LED panel 12 is started so as to achieve the function of warning the user of other vehicle.

The control module is electrically connected between the output ends 111 and the battery 113 and the control module is configured to control the output power of the output ends 111. In more details, the control module is configured to control the power generated from the battery 113 to respectively suitable for the USB output port 111A and the 12 volt output port 111B, so the different external electronic device can be charged by the corresponding output ends 111.

Figure 3:
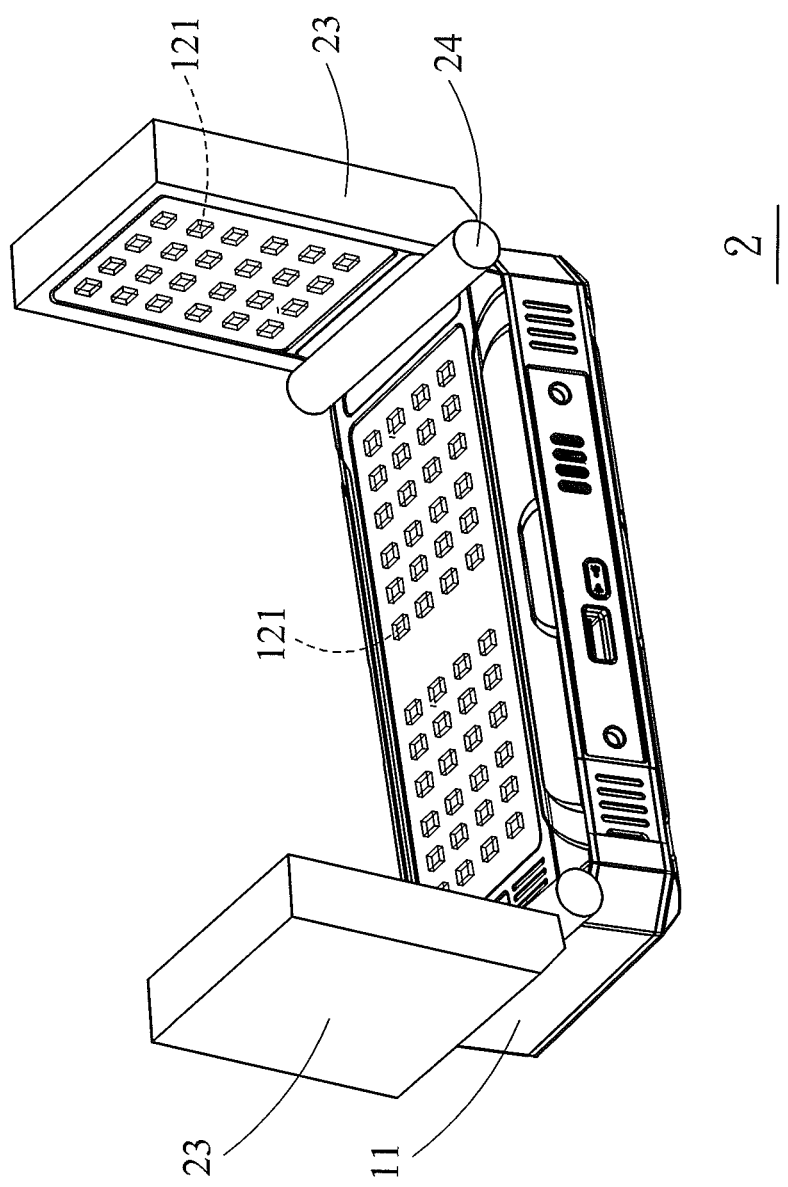
FIG. 3 illustrates a schematic diagram of the car jump starter having warning LED panel of another embodiment in the instant invention.

Please refer to FIG. 3 which illustrates a schematic diagram of the car jump starter having warning LED panel of another embodiment in the instant invention. The car jump starter having warning LED panel 2 includes all the above technical features of the car jump starter having warning LED panel 1 and further includes at least a cover 23. In the present embodiment, the car jump starter having warning LED panel 2 has two covers 23 and the size of one surface of each cover 23 is a half of that of the case 11 and the two covers 23 are connected by a pivot bearing 24 to a right-side and left-side rims of the case 11, respectively. The cover 23 is configured to be rotated around the rim of the case 11 and close a top surface of the case 11 and the top surface of the case 11 is entirely covered by the two covers 23, so as to decrease an occupied space of the two covers 23 when the car jump starter having warning LED panel 2 is not used. Moreover, each cover 23 has 24 LED modules 121. Therefore, the number of the LED modules 121 of the car jump starter having warning LED panel 2 and a lighting area would be greatly increased. Furthermore, the cover 23 has the function of rotating, so an illumination angle can be adjusted and increasing the warning effect at night.

In the present embodiment, the number of LED module 121 of each block is 24, but the number of the LED module 121 is not limited in it. In other embodiment, the number of the LED module 121 in each block can be adjusted based on the different conditions for achieving different lighting effect.

In comparison with traditional car jump starter, the car jump starter having warning LED panel 1 has the function of warning the driver of the vehicle. By disposing the LED panel 12, the car jump starter having warning LED panel 1 can not only charge the automobile battery but also warn the drivers of other moving vehicles, especially on the superhighway at night by lighting the LED modules 121. Furthermore, by disposing the cover 23, an illumination area of the LED module 121 is greatly increased and the different illumination angle of the LED module 121 can also be greatly increased. Therefore, by efficiently increasing the illumination area and illumination angle of the LED module 121, the car jump starter having warning LED panel 1 can effectively warn the drivers of other moving vehicles in the different conditions.

Although the description above contains many specifics, these are merely provided to illustrate the invention and should not be construed as limitations of the invention's scope. Thus it will be apparent to those skilled, in the art that various modifications and variations can be made in the system and processes of the present invention without departing from the spirit or scope of the invention.

What is claimed is:

1. A car jump starter having warning LED panel is configured to deliver power to an automobile battery of a car, the car jump starter having warning LED panel including:
    a case;
    multiple output ends disposed at one side of the case, the output ends configured to be electrically connected with an external electronic device;
    an input end disposed at one side of the case, the input end configured to be electrically connected with an external power;
    a battery disposed in the case;
    an output module electrically connected with the battery, the output module configured to deliver power to the automobile battery;
    means for warning other drivers in other driving cars, the means including a LED panel,
    the LED panel disposed on a top surface of the case, and the LED panel including multiple LED modules; and
    a cover having multiple LED modules, the cover connected by a pivot bearing to a rim of the case and configured to be rotated around the rim of the case and close the top surface of the case.

2. The car jump starter of claim 1, wherein the LED module is a RGB LED.

3. The car jump starter of claim 1, wherein the multiple output ends include an USB output port and a 12 volt output port.

4. The car jump starter of claim 1, further including a control module, the control module electrically connected between the multiple output ends and the battery, and the control module configured to control the output power of the multiple output ends.

5. The car jump starter of claim 1, further including a sticking element, the sticking element disposed at another side of the case, and the sticking element configured to be stuck on an external object.

6. The car jump starter of claim 5, wherein the sticking element is a magnet.

7. The car jump starter of claim 1, further including a lighting LED.

8. The car jump starter of claim 1, wherein the external electronic device is a smart phone, a tablet PC computer, a smart watch, or an event data recorder.

9. The car jump starter of claim 1, wherein the LED panel is divided into two blocks.

10. The car jump starter of claim 1, wherein one of the two blocks is lit or closed when another of the two blocks is lit.

* * * * *